United States Patent
Martin et al.

(10) Patent No.: US 8,250,049 B2
(45) Date of Patent: *Aug. 21, 2012

(54) SYSTEM FOR HANDLING META DATA FOR DESCRIBING ONE OR MORE RESOURCES AND A METHOD OF HANDLING META DATA FOR DESCRIBING ONE OR MORE RESOURCES

(75) Inventors: Erhard Martin, Karlsruhe (DE);
Andreas Engel Krebs, Karlsruhe (DE);
Philipp Marcus, Dielheim (DE)

(73) Assignee: SAP AG, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/574,446

(22) Filed: Oct. 6, 2009

(65) Prior Publication Data

US 2010/0023550 A1      Jan. 28, 2010

Related U.S. Application Data

(63) Continuation of application No. 11/521,630, filed on Sep. 15, 2006, now Pat. No. 7,620,643.

(30) Foreign Application Priority Data

Sep. 16, 2005    (EP) .................................. 05077120

(51) Int. Cl.
 *G06F 17/30* (2006.01)
 *G06F 17/00* (2006.01)

(52) U.S. Cl. ........................................ 707/705; 715/234

(58) Field of Classification Search ........................ None
See application file for complete search history.

(56) References Cited

U.S. PATENT DOCUMENTS

| | | | |
|---|---|---|---|
| 6,636,845 B2 * | 10/2003 | Chau et al. | ............................ 1/1 |
| 6,725,231 B2 | 4/2004 | Hu et al. | |
| 6,732,095 B1 | 5/2004 | Warshavsky et al. | |
| 6,782,394 B1 | 8/2004 | Landeck et al. | |
| 6,874,146 B1 | 3/2005 | Iyengar | |
| 6,889,223 B2 | 5/2005 | Hattori et al. | |
| 6,941,511 B1 | 9/2005 | Hind et al. | |
| 6,978,422 B1 | 12/2005 | Bushe et al. | |
| 7,272,615 B2 | 9/2007 | Li et al. | |
| 7,434,156 B1 | 10/2008 | Leong et al. | |
| 2002/0142278 A1 * | 10/2002 | Whitehurst et al. | .......... 434/350 |
| 2004/0002888 A1 * | 1/2004 | Draper et al. | ..................... 705/9 |
| 2005/0114359 A1 | 5/2005 | Li et al. | |
| 2005/0203931 A1 | 9/2005 | Pingree et al. | |
| 2005/0227218 A1 | 10/2005 | Mehta et al. | |
| 2006/0206518 A1 * | 9/2006 | Bhatia | ........................ 707/104.1 |

(Continued)

OTHER PUBLICATIONS

Graziano et al. "Metadata Models for QoS-Aware Information Management Systems" SEKE '02, Jul. 15-19, 2002, Ischia, Italy. Copyright 2002 ACM.

(Continued)

*Primary Examiner* — Pierre Vital
*Assistant Examiner* — Berhanu Mitiku
(74) *Attorney, Agent, or Firm* — Kenyon & Kenyon LLP

(57) ABSTRACT

A system for handling meta data for describing one or more resources, wherein the one or more resources are deliverable to a common group of users at one or more user terminals, the system including: a resource server for storing the one or more resources for delivery to at least one of the common group of users at one or more user terminals, an administration server arranged to serve the common group of users at the one or more user terminals, for storing a set of meta data for describing the learning resources, the meta data having a format including a non-semantic tag which is customizable in accordance with the common group of users' requirements.

17 Claims, 4 Drawing Sheets

U.S. PATENT DOCUMENTS

2006/0224613 A1 10/2006 Bermender et al.
2006/0230124 A1 10/2006 Belfiore et al.
2007/0111180 A1* 5/2007 Sperle et al. .................. 434/350

OTHER PUBLICATIONS

Hinds et al. "Managing Metadata for Distributed Information Servers" Department of Electrical Engineering and Computer Science, The University of Michigan, Ann Arbor, Michigan 48109.

Li "Open Learning Objects for Data Structure Course" Department of Computing and Mathematical Sciences Texas A&M University—Corpus Christi Corpus Christi, TX 78412, 2003.

Candan et al. "Resource Description Framework: Metadata and Its Applications" K. Selc,uk Candan, Huan Liu, and Reshma Suvarna, Department of Computer Science & Engineering, Arizona State University, Tempe, AZ 852875406, vol. 3, Issue 1.

\* cited by examiner

```
<?xml version="1.0" encoding="UTF-8"?>
<!DOCTYPE LSOMETADATA
[<!ELEMENT LSOMETADATA (VALUE)*>
<!ATTLIST LSOMETADATA VERSION NMTOKEN #REQUIRED>
<!ELEMENT VALUE (#PCDATA)>
<!ATTLIST VALUE
          TYPE CDATA #REQUIRED
          NAME CDATA #REQUIRED]>
<LSOMETADATA VERSION="1">
<VALUE TYPE="xs:string" NAME="author">author</VALUE>
<VALUE TYPE="xs:string" NAME="title">title</VALUE>
</LSOMETADATA>
```

| Field | Value |
|---|---|
| Author | krebs |
| Description | In descr |
| Language | EN |
| Last Edited | Feb 16, 2005 8:24:12 AM |
| Name | learntime test |

Tabs: Mandatory Fields | Optional Fields | Additional Fields

- Mandatory Tab 42
- Optional Tab 43
- Additional Tab 44
- Screen 40 — Edit Meta data
- Value Column 53
- Field Column 53
- Author Field 47
- Description Field 48
- Language Field 49
- Last Edited Field 50
- Name Field 51
- Confirmation Icon 45 — OK
- Cancel Icon 46 — Cancel

SYSTEM FOR HANDLING META DATA FOR DESCRIBING ONE OR MORE RESOURCES AND A METHOD OF HANDLING META DATA FOR DESCRIBING ONE OR MORE RESOURCES

CROSS-REFERENCE TO RELATED APPLICATIONS

This application is a continuation of and claims priority under 35 U.S.C. §120 to U.S. patent application Ser. No. 11/521,630, filed on Sep. 15, 2006, and entitled "System and Method for Handling Metadata Describing One or More Resources," which is herein incorporated by reference in its entirety and which claims priority under 35 U.S.C. §119 to European Patent Application No. 05077120.3 filed on Sep. 16, 2005.

FIELD OF THE INVENTION

The invention relates to a system for handling meta data for describing one or more resources and a method of handling meta data for describing one or more resources.

BACKGROUND INFORMATION

Systems and methods of handling meta data for describing one or more resources are known in the art. Such systems and methods may find application in e-learning systems and methods. They are however, not limited in this respect, and have further application in other fields, for example, data base management and other fields where meta data is used.

Systems and applications for providing e-learning, also referred to in the art, inter alia, as computer based training, computer assisted instruction and technology supported learning, are known. Such applications and systems use content, for example, lectures and book chapters, which are delivered to users electronically. In order to describe the e-learning content, meta data is associated with the content. XML (extensible mark-up language) based standards is one technology, which is conventionally used to define meta data. During the creation of e-learning content it is desirable to keep track of the meta data associated with the content. To this end, several standards for defining e-learning meta data have evolved. For example, learning object meta data standard (LOM) and Dublin Core. However, in order to accommodate the needs of a broad range of users of the e-learning content including e-learning participants as well as e-learning providers, a "one size fits all" approach is used. As a result, the existing standards include large quantities of meta data definitions which are not required by some users or not available to other users. Thus, a large proportion of conventional meta data is optional. This results in a particular user or group of users, for example, an organization, who wish to use the standards, not being able to rely on a particular meta data, which they require, being present in a conventional meta data file. For example, conventional standards, such as LOM and Dublin Core have a relatively large set of fixed values with a predefined semantic which can be used in documents formatted according to these standards using for example, an XML tag. For example, fixed values with a predefined semantic include author, title, etc. Due to their fixed values, defined semantic and predefined XML tags, such standards are useful for exchanging meta data between different independent users (for example, users not connected by the same intranet) or different organisations. However, as mentioned above, it is not optimal for use within an organisation. Due to the large number of possible values necessary in order to account for most possible user requirements, most values are optional and can contain arbitrary text. Further, there is no restriction with respect to which meta data values are to be maintained and which format they should preferably be in for a particular user or organisation. Yet further, it is not possible to maintain meta data, that may not be covered by the possible fixed values of the standards, for example, meta data that may be unique to a particular user or organisation.

SUMMARY OF THE INVENTION

It is an object of the present invention to address those problems encountered with conventional systems. For example, it is an object of the present invention to improve the delivery of resources to users. It is a further object to address those problems encountered with conventional meta data standard technology, such as XML. For example, it is desirable to improve the maintenance of meta data within a group of common users, an organization or the like.

According to a first aspect of the invention, there is provided a system for handling meta data for describing one or more resources, wherein the one or more resources are deliverable to a common group of users at one or more user terminals, the system including:

a resource server for storing the one or more resources for delivery to at least one of the common group of users at one or more user terminals, an administration server arranged to serve the common group of users at the one or more user terminals, for storing a set of meta data for describing the learning resources, the meta data having a format including a non-semantic tag which is customisable in accordance with the common group of users' requirements.

According to a second aspect of the invention, there is provided a method of handling meta data for describing one or more resources, the method comprising delivering one or more learning resources to a common group of users at one or more user terminals, the method further including: storing in a resource server the one or more resources for delivery to at least one of the common group of users at one or more user terminals, storing a set of meta data for describing the resources in an administration server arranged to serve the common group of users at the one or more user terminals, the meta data having a format including a non-semantic tag which is customisable in accordance with the common group of users' requirements.

According to a third aspect of the invention, there is provided a user terminal.

According to a fourth aspect of the invention, there is provided a program storage device readable by a processing apparatus, the device embodying a program of instructions executable by the processor.

BRIEF DESCRIPTION OF THE DRAWINGS

FIG. 2 is a listing of a code for implementing an embodiment of the present invention.

FIG. 4 shows an learning solution authoring environment which can be used to maintain the meta data values according to an embodiment of the invention.

DETAILED DESCRIPTION

Figure 1:
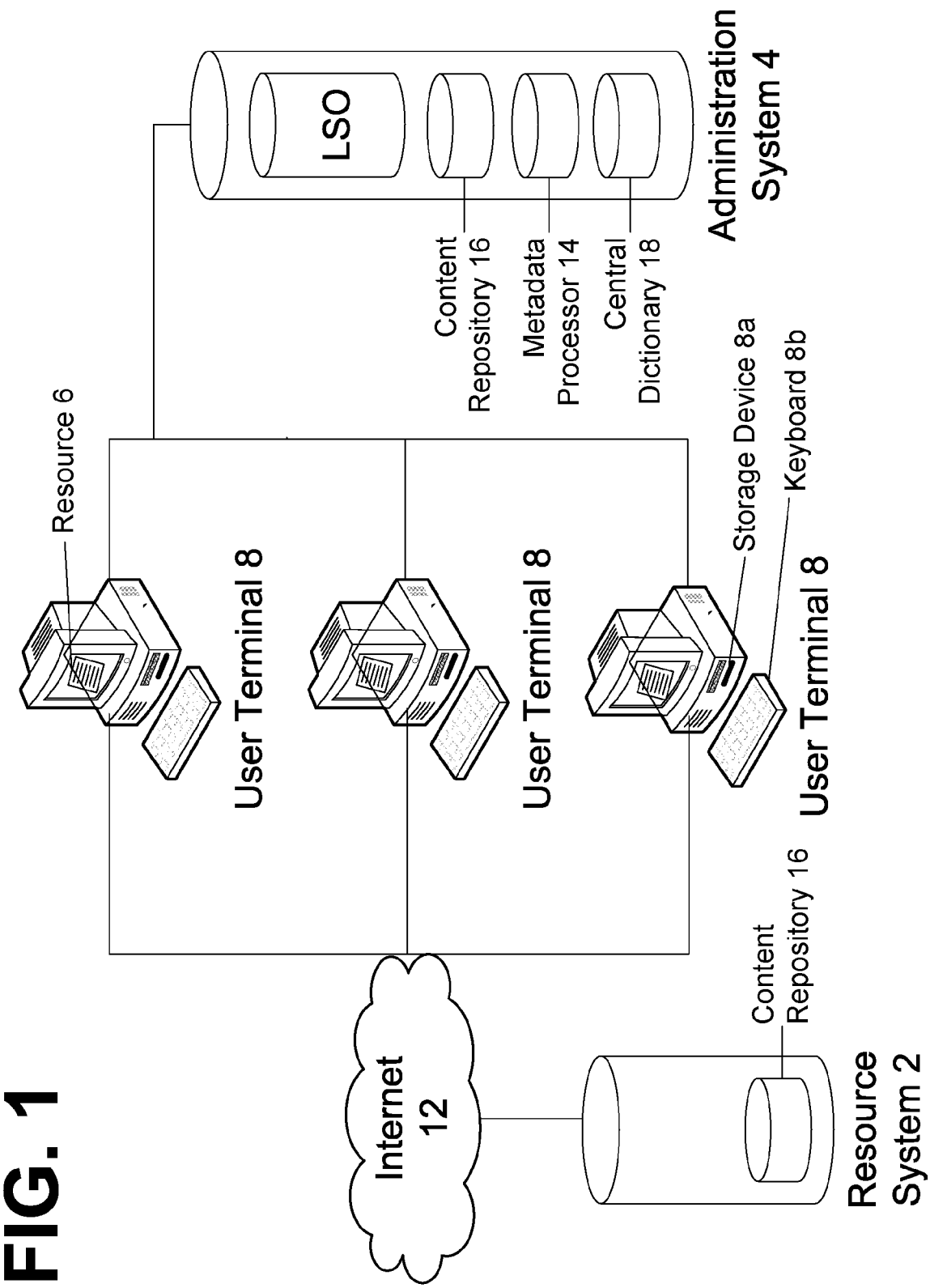
FIG. 1 shows an architecture incorporating an embodiment of the present invention.

FIG. 1 shows an architecture incorporating an embodiment of the present invention. The architecture includes a system 2, 4 for handling meta data for describing one or more resources. Further, the system is arranged to deliver one or more resources 6 to common group of users 8. In one embodiment, the system is an e-learning system and the one or more resources include one or more learning resources. The system may include a learning resource system, also referred to as a content server or learning resource server 2, for storing the one or more learning resources for delivery to at least one of the common group of users at one or more user terminals 8. Systems and methods of handling meta data for describing one or more resources are known in the art. Such systems and methods may find application in e-learning systems and methods. They are however, not limited in this respect, and have further application in other fields, for example, data base management and other fields where meta data is used. The one or more user terminal 8 typically comprises a processor and a storage device 8a, for example, a hard drive. To interact with a user, the user terminal may comprise a keyboard and pointing device 8b, or the like and a display, for example, a monitor including a screen. The user terminal may be a desktop unit. Alternatively, it may be a handheld device, or the like, such as a laptop computer, etc. Data may be exchanged between the processor and the storage device in the hard drive. It may also be exchanged between the keyboard and the display and between the display and the hard drive. In FIG. 1 arrows linking entities indicates that data may be exchanged between such linked entities.

The system further includes an administration system 4 arranged to serve the common group of users at the one or more user terminals, for storing a set of meta data for describing the learning resources, the meta data having a format including a non-semantic tag which is customisable in accordance with the common group of users. The users are connected to the administration system 4 and the learning resource system 2 by communication links over which data may be communicated. In the embodiment shown, the learning resource system 2 is connected to the user terminals 8 and the administration system 4 via the internet 12, or the like. In an alternative embodiment, the learning resource system 2 and the administration system 4 are provided on the same communications network. For example, on a network provided within one organisation, such as an intranet, LAN (local area network), or the like.

A group of common users may be a group of users having substantially similar requirements in terms of the meta data they desire to describe the learning resource or resources they are interested in. The group of common users may be based in an organisation, or may be distributed amongst a variety of different organisations. Organisations include, but are not limited to, enterprises including companies and the like, non-profit organisations, such as charities, universities, schools and other learning establishments. The group of common users may be served by the same server. Alternatively, they may be served by different servers. The administration system may be implemented using a server 4, such as, for example, the SAP R/3 4.6C and learning solution (LSO) Add-on, which may also be referred to as the LSO backend. The administration system 4 may include a database of learner accounts and course information. In particular, it may be a platform as part of the LSO to enable the administration of e-learning, for example, the business of delivering and creating content. For example, the database may include the learner account, may include demographic data about the learner, for example, a name, an age, a sex, an address, a company, a school, an account number and a bill. It may further include his/her progress through the course material. For example, places visited, tests completed, skills gained, knowledge acquired and competency using the material. The administration system 4 may also provide additional information about courses, such as the courses offered, the author/instructor of a course and the most popular courses. Further, in an embodiment of the invention, since the meta data format itself does not contain any semantic information, the semantic organization, or common group of users, wide information about the meta data values is stored in a central dictionary, for example, in the administration system 4. However, in an alternative embodiment, the dictionary storing the semantic information may be stored in another database accessible to the group of users or organization, for example, in the learning resource system 2.

The content management system 2 may include a learning content server 2. The learning content server 2 may be implemented using an WebDAV server. The learning content server 2 may include a content repository 16. The content repository 16 may store course files 6 and media files 6 that are used to present a course to a learner at the learning station 8. The course files 6 may include the structural elements that make up a course and may be stored as XML files The media files may be used to store the content that is included in the course and assembled for presentation to the learner at the learning station.

The learning management system may include a content player. The content player may be implemented using a server, such as, an SAP J2EE Engine. The content player is used to obtain course material from the content repository 16.

The learning management system may also include an interface for exchanging information with the administration system. For example, the content player may update the learner account information as the learner progresses through the course material.

FIG. 2 is a listing of a code for implementing an embodiment of the present invention. Each line of the code shown in FIG. 2 is repeated hereinbelow together with an explanation of the meaning of each particular line.

Description of the Code Shown in FIG. 2:

"<?xml version="1.0" encoding="UTF-8"?>"

A generic XML header defining the XML version and character encoding for this XML document.

"<!DOCTYPE LSOMETADATA"

Start of a DTD (Document Type Definition) for this XML document—the DTD describes a valid syntax for the document and allows easy validation of the document.

This line simply defines that the root tag for this document is LSOMETADATA.

"[<!ELEMENT LSOMETADATA (VALUE)*>"

This line defines that the LSOMETADATA tag can contain only VALUE tag and the * defines that there can be 0 or more of these VALUE tags.

"<!ATTLIST LSOMETADATA VERSION NMTOKEN #REQUIRED>"

The line defines that the LSOMETADATA tag has a mandatory (#REQUIRED) numerical (NMTOKEN) attribute VERSION.

"<!ELEMENT VALUE (#PCDATA)>"

The line defines that the VALUE tag can contain any kind of data.

"<!ATTLIST VALUE"

The line defines that the attributes for the tag VALUE follow.

"TYPE CDATA #REQUIRED"

The line defines the mandatory attribute TYPE of tag VALUE.

"NAME CDATA #REQUIRED>]>"

The line defines the mandatory attribute NAME of tag VALUE and the end of the DTD (]>).

The lines given above are common to XML documents of this type and contain no metadata, these lines only define how a typical valid meta data file may look like.

The following lines contain the actual meta data, in particular, the meta data according to an embodiment of the invention:

"<LSOMETADATA VERSION="1">"

This tag starts the LSOMETADATA document with the attribute VERSION set to 1.

"<VALUE TYPE="xs:string" NAME="author">author</VALUE>"

This tag defines the metadata value "author" (between the <VALUE> and </VALUE>tags) and the attributes TYPE ("xs:string") and NAME ("author").

"<VALUE TYPE="xs:string" NAME="title">title</VALUE>"

This tag defines the metadata value "title" with the attributes TYPE ("xs:string") and NAME ("title").

"</LSOMETADATA>"

This tag defines the end of the metadata document.

To address the problems identified in the prior art, a meta data format according to a predefined standard, such as XML, is introduced. The meta data describes data, typically, the learning resource 6. The XML based meta data format is free of semantics. In particular, the semantic meaning is dissociated from the tag 20. Instead of using tags with semantic, as is the conventional approach, generic tags 20 are used which can be used to store key value pairs, for example, the value and the value type. The code shown in FIG. 2 is a sample of such a generic meta data file which contains the meta data values author 21 and title 22, which are both of type string. For the code appearing in FIG. 2, the standard XML notation applies. For example, it is commented that it is conventional in XML notation to depict meta data in capitals. In FIG. 2, the words author and title are lower case, indicating that they represent real information, rather than semantic information. The meta data file includes meta data 23, in particular, learning solution meta data. According to an embodiment of the invention, the content server 2 stores the meta data 23 together with the learning resource 6. In particular, the meta data format including the generic tag 20 is stored together with a semantic look-up table, also referred to as a dictionary. In an alternative embodiment, the learning resource 6 is stored remotely from the standard format meta data. The generic meta data 23 is stored on the administration server 4. When a learning resource 6 is imported, the standard meta data is transformed into the generic format. Further, when a learning resource 6 is exported to a remote administration server 4, the metadata is transformed out of the generic format 23. In one embodiment, the metadata and transformations are stored on the learning solution back end LSO.

Since there is no common standard for e-learning meta data and no fixed set of data relevant for all users, the inventors have found a different approach. According to an embodiment of the invention, instead of using a format with fixed data, a format without fixed data, such as, for example, author, title, etc. In contrast to conventional meta data, the meta data according to an embodiment of the invention, includes a unique identifier, also referred to as a key, importance classification, for example, if the value is mandatory or optional, a type and a value for each data. The key is a unique identifier representing the semantic of the value, for example, the author. However, the set of possible keys is not defined a priori, but is customizable by the user in the LSO e-learning system. Together with the key, the user may customize the importance of the data, for example, whether it is mandatory or optional, and the data type, for example, whether it is an integer, string, date, etc. The data format according to an embodiment of the invention allows the customer to keep track of which meta data fields he wants and by marking a data as mandatory is able to ensure that the data is maintained in the e-learning system 2, 4.

In one embodiment, the administration server 4 includes a meta data processor 14, wherein the generic format 23 further includes a unique identifier 20 for identifying the non-semantic tag 20 to the meta data processor 14. In a further embodiment, the learning resources 6 stored on the learning resource server 2 are described by one or more meta data 23 having a format 20 in accordance with a predefined standard. In a further embodiment, the meta data processor 14 is arranged to transform the meta data having the format in accordance with the predefined standard in to the format 23 including a non-semantic tag 20 using the unique identifier. In particular, the meta data processor 14 is arranged to at least one of import and export meta data in a format by transforming the format into or from another meta data format in a predefined standard.

Figure 3:
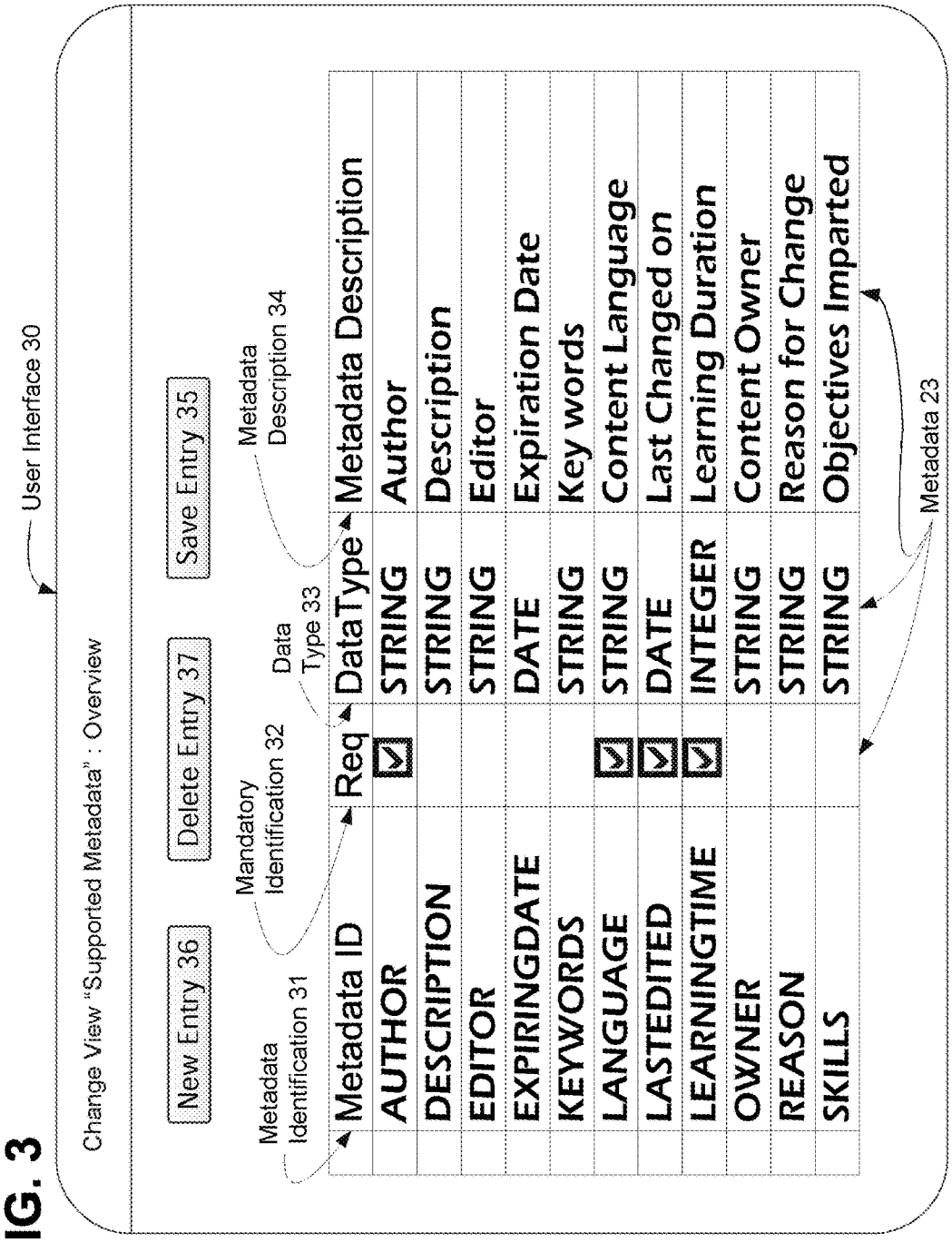
FIG. 3 shows a customizing user interface of a learning solution according to an embodiment of the invention.

FIG. 3 shows a customizing user interface of a learning solution according to an embodiment of the invention. In particular, the user interface 30 of the learning solution can be used to customize the meta data values 23 which are to be maintained for e-learning courses used within the learning solution system 2, 4. The customizing is carried out in the central customizing of the learning solution backend LSO, which is part of the e-learning system 2, 4. In one embodiment, the e-learning system 2, 4 further comprising a user interface generator 16 for generating a user interface 30 which a user can interact with to customize the meta data 23 in accordance with the user's or the common group of users' requirements. In a further embodiment, the user interface 30 includes a screen displaying one or more fields 31-34 wherein at least one of a meta data identification 31, a mandatory indication 32, a data type 33 and a metadata description 34 may be entered, respectively. The meta data identification 31 indicates the type of meta data, for example, author, description, editor, expiring date, keywords, language, last edited, learning objectives, learning time, name, owner, provider, publisher, reason, release, release date, skills, status, subject, etc. . . .

During the customizing, according to an embodiment of the present invention, the following information is maintained: The meta data identification 31. The meta data identification 31 is a unique identification and corresponds to the name used in the XML format to describe the value. The required indication 32: the required indication 32 indicates whether the value is mandatory (required) or optional. The data type field 33 indicates the type of meta data to describe the meta data, for example, whether the meta data for a particular type is a string, a date, boolean, integer, . . . etc.

The meta data description field 34 is a language dependent description of the value for use in the user interface. In particular, the meta data description describes the meta data identified in metadata identification field 31.

The mandatory indication 32 allows the user to customize whether the data type, for example, those data types listed above, such as author, title, etc. are required or not for a particular user of group of users, in particular for a particular common group of users. In the embodiment shown in FIG. 3, it is seen that the meta data types author, language, last edited, leaning time and name have been customized as being required for the common group of users in question. In some instances, the meta data description 34 is the same as the meta data identification 31, for example, for the meta data type author. However, for other instances, it may be desirable to customize the meta data description for the user or, in particular, for the common group of users. In which case, the meta data description 34 may be customized so that it is different from the meta data identification 31, for example, Last Changed On, Learning Duration, etc. . . . In this way, the meta data description can be presented to the common group of users in terms which are familiar.

Having customised the meta data in accordance with the requirements of a particular group of users, the customized settings can be saved by clicking save icon 35.

Other functions which may be provided according to further embodiments of the invention include: adding new meta data. This may be done by pressing the "New Entries" icon 36 which displays a user interface for creating new entries. Further, an entry or entries may be deleted. This may be done by pressing a "Delete Entries" icon 37 which displays a user interface for deleting an entry or entries. A further function includes changing the description of the meta data and translating it. In one embodiment, the description of the meta data is maintained in the logon language. In this embodiment, to translate a description into another language, for example, German, would require the user to log on in German. However, in an alternative embodiment, the description of the meta data is translatable once a user is already logged on. In this way, the flexibility of the system with respect to a user's preferences is improved.

An application using the meta data, for example, as shown in FIG. 4, first accesses a central dictionary 18 to retrieve the known values and then present a corresponding user interface using the actual data from a meta data file. The location of the stored central dictionary 18, shown in FIG. 1, is not limited. In the embodiment shown in FIG. 1 it is located on the administration server 4. However, in an alternative embodiment, it may be located on the learning server 2 or a further server or storage medium.

FIG. 4 shows an learning solution authoring environment which can be used to maintain the meta data values according to an embodiment of the invention. In particular, FIG. 4 shows an example of a screen shot of the learning solution authoring environment where the meta data for an e-learning course can be maintained. The information about the meta data fields, their data type and whether they are mandatory or optional is retrieved from the learning solution customizing stored, for example, on the R/3 LSO backend. The meta data values are read from the e-learning courses XML meta data file. In particular, FIG. 4 shows a user interface including a screen 40 wherein which the user can edit meta data. The screen displays at least one of mandatory tab strip 42, optional tab strip 43 and additional tab strip 44.

The tab strips 42, 43, 44 show where the fields are grouped according to their mandatory indication. For example, the Mandatory fields tab 42 contains all metadata customized as mandatory. The Optional tab 43 contains all metadata customized as not mandatory. The Additional tab 44 contains all metadata values encountered, that are not defined in the customizing. For example, this may occur if the customizing is changed or metadata from foreign systems is imported.

In each of the three tabs 42, 43, 44 each row 47-51 represents a metadata as customized. The Field column 52 contains the language dependent description as entered in the customizing, except for the additional fields where the content of the NAME attribute from the metadata file is used, since there is no customizing for this metadata.

The value column 53 contains the value as stored in the metadata file if it is available, otherwise no value is displayed. The value cells that do not allow input are metadata the authoring environment automatically maintains which the user therefore the user cannot change.

The third row on each tab is a single icon which would switch the row to multi line editing in order to enter a value that does not fit into a single line.

The user is able to edit the fields 47, 48, 49, 50, 51, also referred to as data types, in order to maintain the meta data. In particular, the user is able to maintain the field (i.e. the data type, also referred to as the meta data description with reference to FIG. 3). In a further embodiment, the screen includes at least one of an confirm icon 45 whose selection by a users saves the edited meta data and a cancel icon 46 whose selection by a user cancels the edited meta data.

The invention as described can be implemented in digital electronic circuitry, or in computer hardware, firmware, software, or in combination thereof. An apparatus according to the present invention can be implemented in a computer program product tangibly embodied in a machine readable storage device for execution by a programmable processor; and method steps of the invention can be performed by a programmable processor executing a program of instructions to perform functions of the invention by operating on input data and generating output. The invention can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Typically, a processor will receive instructions and data from a read-only memory and/or a random access memory. Typically, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EEPROM, and flash memory devices; magnetic disks such as internal hard disks and removable disks; magneto-optical disks; and CD-ROM disks. Any of the foregoing can be supplemented by, or incorporated in ASICs (application specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

Whilst specific embodiments of the invention have been described above, it will be appreciated that the invention may be practiced otherwise than as described. The description is not intended to limit the invention.

What is claimed is:

1. A system comprising:
    a server connected to a network, the server storing meta data including a comment in the meta data within an XML document, the comment defining:
        a root tag associated with the document, the root tag having a numerical attribute representing a version number of the root tag;

an identification of an additional tag contained within the root tag;

a type attribute associated with the identified additional tag, the type attribute requiring a type of data contained within the identified additional tag;

a name attribute associated with the identified additional tag, the name attribute requiring a name of the data contained within the identified additional tag; and the server configured to, responsive to identifying a learning resource related to the root tag, compare tag names of meta data associated with the identified resource to a list of name attributes included in the comment of the XML document to identify supported meta data of the identified learning resource;

extract the meta data tag name and value pairs of supported meta data from the identified learning resource;

generate a meta data document containing the root tag, the version number of the root tag, the identified additional tag associated with the name attribute of the supported meta data, and the extracted tag name and value pairs formatted according to the type attribute associated with the identified additional tag of the supported meta data;

store the generated meta data document in a storage device; and subsequently access the generated meta data document in the storage device to retrieve information about the learning resource from the stored meta data document.

2. The system of claim 1, wherein the server is further configured to, responsive to a request containing the root tag to later export the learning resource:

retrieve the created meta data document containing the root tag;

extract the meta data tag name from the name attribute and the meta data value associated with the meta data tag name from the root tag; and update the meta data tag in the learning resource with any extracted changes to the meta data value associated with the meta data tag name.

3. The system according to claim 1, wherein the server includes a meta data processor, and wherein the format further includes a unique identifier for identifying the additional tag to the meta data processor.

4. The system according to claim 3, wherein the learning resource contains the plurality of tags in accordance with a predefined standard format.

5. The system according to claim 4, wherein the meta data processor is arranged to transform meta data in the predefined standard format into the format configured to include the comment within the XML document.

6. The system according to claim 1, wherein a meta data processor is arranged to at least one of import and export meta data in a format by transforming the format into or from a predefined standard format.

7. The system according to claim 4, wherein the meta data is stored together with the learning resource.

8. The system according to claim 4, wherein the predefined standard is XML.

9. The system according to claim 1, wherein the server is further configured to instantiate a user interface generator for generating a user interface which a user can interact with to customize the meta data.

10. The system according to claim 9, wherein the user interface includes a screen displaying one or more fields wherein at least one of a meta data identification, a mandatory indication, a data type and a metadata description may be entered, respectively.

11. The system according to claim 9, wherein the user interface includes a screen wherein which the user can edit meta data.

12. The system according to claim 11, wherein the screen displays at least one of mandatory fields, optional fields and additional fields.

13. The system according to claim 1, wherein the system is an e- learning system.

14. A method comprising:

responsive to a processing device importing a learning resource related to a root tag, the root tag included in a comment within an XML document, the comment defining:

the root tag associated with the XML document, the root tag having a numerical attribute representing a version number of the root tag;

an identification of an additional tag contained within the root tag;

a type attribute associated with the identified additional tag, the type attribute requiring a type of data contained within the identified additional tag; and a name attribute associated with the identified additional tag, the name attribute requiring a name of the data contained within the identified additional tag;

receiving meta data associated with the learning resource containing a plurality of tags;

comparing, through the processing device, the tag names of the received meta data to a list of name attributes associated with the identified additional tag contained within the root tag to identify supported meta data;

extracting the meta data tag name and value pairs from the identified supported meta data;

generating, through the processing device, a meta data document containing the root tag, the version number of the root tag, the identified additional tag associated with the name attribute of the supported meta data, and the extracted tag name and value pairs formatted according to the type attribute associated with the identified additional tag of the supported meta data;

storing the generated meta data document in a storage device; and subsequently accessing the generated meta data document in the storage device to retrieve information about the learning resource from the stored meta data document.

15. The method of claim 14, further comprising creating a meta data document containing the root tag, the version of the meta data document, and the identified additional tag, the identified additional tag containing the extracted meta data tag name as the name attribute, and the value pair associated with the meta data tag name, the value pair being contained in the meta data document in the format specified by the type attribute.

16. The method of claim 15, further comprising, responsive to a request containing the root tag to later export the learning resource, retrieving the created meta data document containing the root tag;

extracting the meta data tag name from the name attribute and the meta data value associated with the meta data tag name from the root tag; and updating the meta data tag in the learning resource with any extracted changes to the meta data value associated with the meta data tag name.

17. A program storage device readable by a processing apparatus, the device embodying a program of instructions executable by the processor to perform the steps comprising:

importing a learning resource related to a root tag, the root tag included in a comment within an XML document, the comment defining:
    the root tag associated with the XML document, the root tag having a numerical attribute representing a version number of the root tag;
    an identification of an additional tag contained within the root tag;
    a type attribute associated with the identified additional tag, the type attribute requiring a type of data contained within the identified additional tag; and
    a name attribute associated with the identified additional tag, the name attribute requiring a name of the data contained within the identified additional tag;
receiving meta data associated with the learning resource containing a plurality of tags;
comparing the tag names of the received meta data to a list of name attributes associated with the identified additional tag contained within the root tag to identify supported meta data;
extracting the meta data tag name and value pairs from the identified supported meta data;
generating, through the processing device, a meta data document containing the root tag, the version number of the root tag, the identified additional tag associated with the name attribute of the supported meta data, and the extracted tag name and value pairs formatted according to the type attribute associated with the identified additional tag of the supported meta data;
storing the generated meta data document in a storage device; and
subsequently accessing the generated meta data document in the storage device to retrieve information about the learning resource from the stored meta data document.

\* \* \* \* \*